(12) United States Patent
Ichikawa et al.

(10) Patent No.: US 11,481,173 B2
(45) Date of Patent: Oct. 25, 2022

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Shinji Ichikawa, Nagoya (JP); Harunobu Saito, Nagoya (JP); Daiki Kaneichi, Nisshin (JP); Ryotaro Fujiwara, Tokyo-to (JP); Megumi Amano, Toyota (JP); Masato Endo, Nagakute (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 441 days.

(21) Appl. No.: 16/549,038

(22) Filed: Aug. 23, 2019

(65) Prior Publication Data

US 2020/0065041 A1 Feb. 27, 2020

(30) Foreign Application Priority Data

Aug. 23, 2018 (JP) .............................. JP2018-156726

(51) Int. Cl.
*G06F 3/14* (2006.01)
*G06Q 30/02* (2012.01)
*G08G 1/01* (2006.01)
(52) U.S. Cl.
CPC ........... *G06F 3/14* (2013.01); *G06Q 30/0265* (2013.01); *G08G 1/0137* (2013.01)

(58) Field of Classification Search
CPC ..... G06F 3/14; G06Q 30/0265; G08G 1/0137
USPC ......................................................... 345/418
See application file for complete search history.

(56) References Cited

U.S. PATENT DOCUMENTS

| | | | |
|---|---|---|---|
| 9,293,042 B1* | 3/2016 | Wasserman | G08G 1/09 |
| 2008/0089288 A1* | 4/2008 | Anschutz | G06Q 30/02 370/331 |
| 2010/0002079 A1* | 1/2010 | Krijn | G09F 19/14 348/148 |
| 2010/0223112 A1* | 9/2010 | Griffin | G06Q 30/0241 705/14.4 |
| 2010/0299189 A1 | 11/2010 | Tanaka | |
| 2013/0060642 A1* | 3/2013 | Shlomot | G06Q 30/0241 705/14.66 |

(Continued)

FOREIGN PATENT DOCUMENTS

| | | |
|---|---|---|
| CN | 101971228 A | 2/2011 |
| CN | 103218728 A | 7/2013 |

(Continued)

*Primary Examiner* — Jin Ge
(74) *Attorney, Agent, or Firm* — Oliff PLC

(57) ABSTRACT

An information processing apparatus, which is provided to display advertisement information on a display apparatus installed with a display surface directed to a road, is configured to execute acquisition of a traveling situation of a vehicle which travels on the road; selection of a first display form or a second display form having an amount of information larger than that of the first display form, as the display form of the advertisement information on the basis of the traveling situation; and display of the advertisement information on the display apparatus in the display form selected on the basis of the traveling situation.

9 Claims, 10 Drawing Sheets

(56) References Cited

U.S. PATENT DOCUMENTS

| | | | |
|---|---|---|---|
| 2013/0132172 A1 | 5/2013 | Liu et al. | |
| 2013/0325629 A1* | 12/2013 | Harrison | G06Q 30/0269 |
| | | | 705/14.66 |
| 2014/0070963 A1* | 3/2014 | DeLorean | G09F 21/04 |
| | | | 340/917 |
| 2014/0214543 A1* | 7/2014 | Gandhi | G06Q 30/0267 |
| | | | 705/14.58 |
| 2014/0279012 A1* | 9/2014 | Scofield | G06Q 30/0261 |
| | | | 705/14.58 |
| 2016/0110759 A1* | 4/2016 | Polehn | G06Q 30/0251 |
| | | | 705/14.49 |
| 2016/0124906 A1* | 5/2016 | Karpov | G06F 17/18 |
| | | | 703/2 |
| 2017/0300971 A1* | 10/2017 | Ohta | G06K 9/00785 |
| 2019/0186929 A1* | 6/2019 | Iwata | G08G 1/0969 |
| 2019/0270384 A1* | 9/2019 | Liu | B60T 1/10 |
| 2019/0311404 A1* | 10/2019 | Wasserman | G08G 1/0141 |
| 2019/0382018 A1* | 12/2019 | Garnault | B60W 60/00272 |
| 2020/0104881 A1* | 4/2020 | Yasui | G06Q 30/0266 |

FOREIGN PATENT DOCUMENTS

| | | |
|---|---|---|
| CN | 107071018 A | 8/2017 |
| JP | 2006-155319 A | 6/2006 |
| JP | 2014-016654 A | 1/2014 |

* cited by examiner

[Fig. 1]
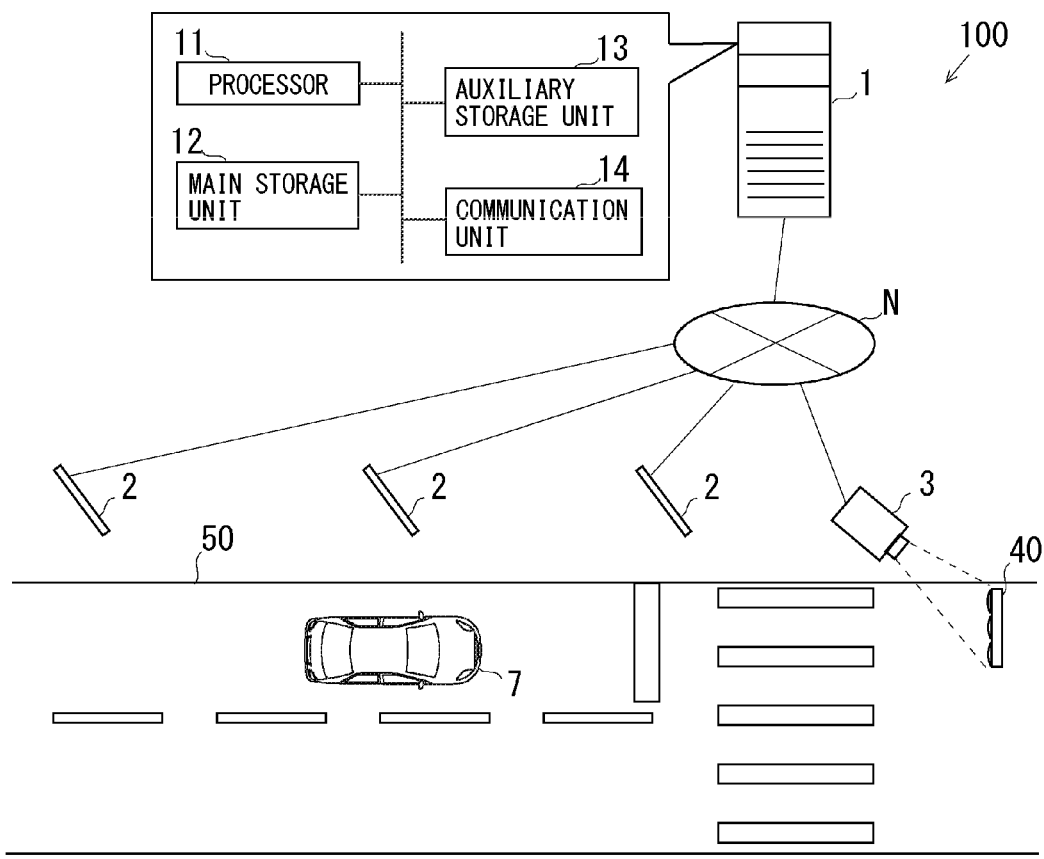
[Fig. 2]
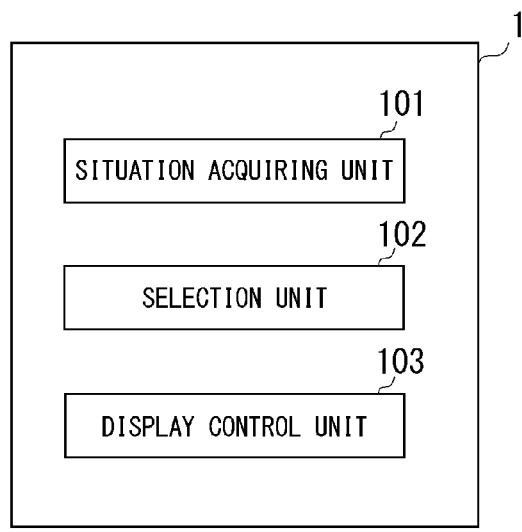

[Fig. 3]

| ADVERTISEMENT ORDER | IDENTIFICATION INFORMATION | ADVERTISEMENT ORDER | TIME ZONE |
|---|---|---|---|
| 001 | X1024680 | A RESTAURANT | TIME ZONE OF COMMUTING TO WORK |
| 002 | A264389 | CD ALBUM | TIME ZONE OF COMMUTING TO WORK |
| : | : | : | : |
| 010 | 1674870 | PR OF D CITY | TIME ZONE OF COMMUTING TO WORK |
| 011 | 46168278 | E BOOKSTORE | TIME ZONE OF DAYTIME |
| : | : | : | : |
| 020 | 5468985 | M ART GALLERY | TIME ZONE OF DAYTIME |
| 021 | 226-46GD | F DRUGSTORE | TIME ZONE OF RETURNING HOME |
| : | : | : | : |
| 010 | 1674870 | PR OF D CITY | TIME ZONE OF COMMUTING TO WORK |
| : | : | : | : |

| ADVERTISEMENT ORDER | IDENTIFICATION INFORMATION | ADVERTISEMENT ORDER | TIME ZONE |
|---|---|---|---|
| 001 | sdjan969 | AA FLOWER SHOP | TIME ZONE OF COMMUTING TO WORK |
| 002 | 21546700 | ○×RAHMEN | TIME ZONE OF COMMUTING TO WORK |
| 003 | fwuey546 | F ROAST MEAT | TIME ZONE OF COMMUTING TO WORK |
| : | : | : | : |
| 010 | 1674870 | PR OF D CITY | TIME ZONE OF COMMUTING TO WORK |
| 011 | 46168278 | E BOOKSTORE | TIME ZONE OF DAYTIME |
| : | : | : | : |
| 020 | 160070 | PR OF E PREFECTURE | TIME ZONE OF DAYTIME |
| 021 | 16-8278 | E HOSPITAL | TIME ZONE OF RETURNING HOME |
| : | : | : | : |
| 030 | kdf16577 | FX BANK | TIME ZONE OF RETURNING HOME |
| : | : | : | : |

[Fig. 4]

| ADVERTISEMENT ORDER | ADVERTISEMENT ELEMENT | TIME ZONE | IDENTIFICATION INFORMATION | DISPLAY FORM |
|---|---|---|---|---|
| 001 | A RESTAURANT | TIME ZONE OF COMMUTING TO WORK | X1024680 | FIRST DISPLAY FORM |
| | | | X1024681 | SECOND DISPLAY FORM |
| 002 | CD ALBUM | TIME ZONE OF COMMUTING TO WORK | 02424580 | FIRST DISPLAY FORM |
| | | | 16kI4870 | SECOND DISPLAY FORM |
| 003 | B ART GALLERY | TIME ZONE OF COMMUTING TO WORK | 025-01 | FIRST DISPLAY FORM |
| | | | 025-02 | SECOND DISPLAY FORM |
| 004 | PR OF D CITY | TIME ZONE OF DAYTIME | Idfdok | FIRST DISPLAY FORM |
| | | | 54d8gh4 | SECOND DISPLAY FORM |
| : | : | : | : | : |
| 125 | E BOOKSTORE | TIME ZONE OF RETURNING HOME | 02424580 | FIRST DISPLAY FORM |
| | | | 167hi870 | SECOND DISPLAY FORM |
| 126 | F DRUGSTORE | TIME ZONE OF RETURNING HOME | 5248754 | FIRST DISPLAY FORM |
| | | | 4614578 | SECOND DISPLAY FORM |
| : | : | : | : | : |

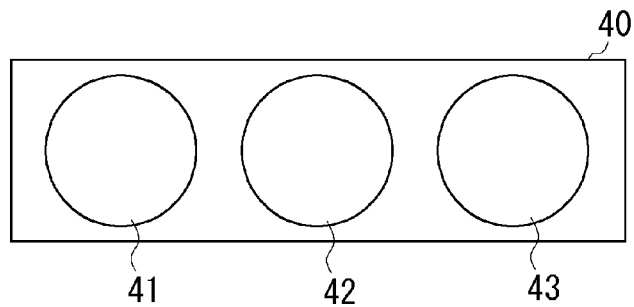

[Fig. 6]
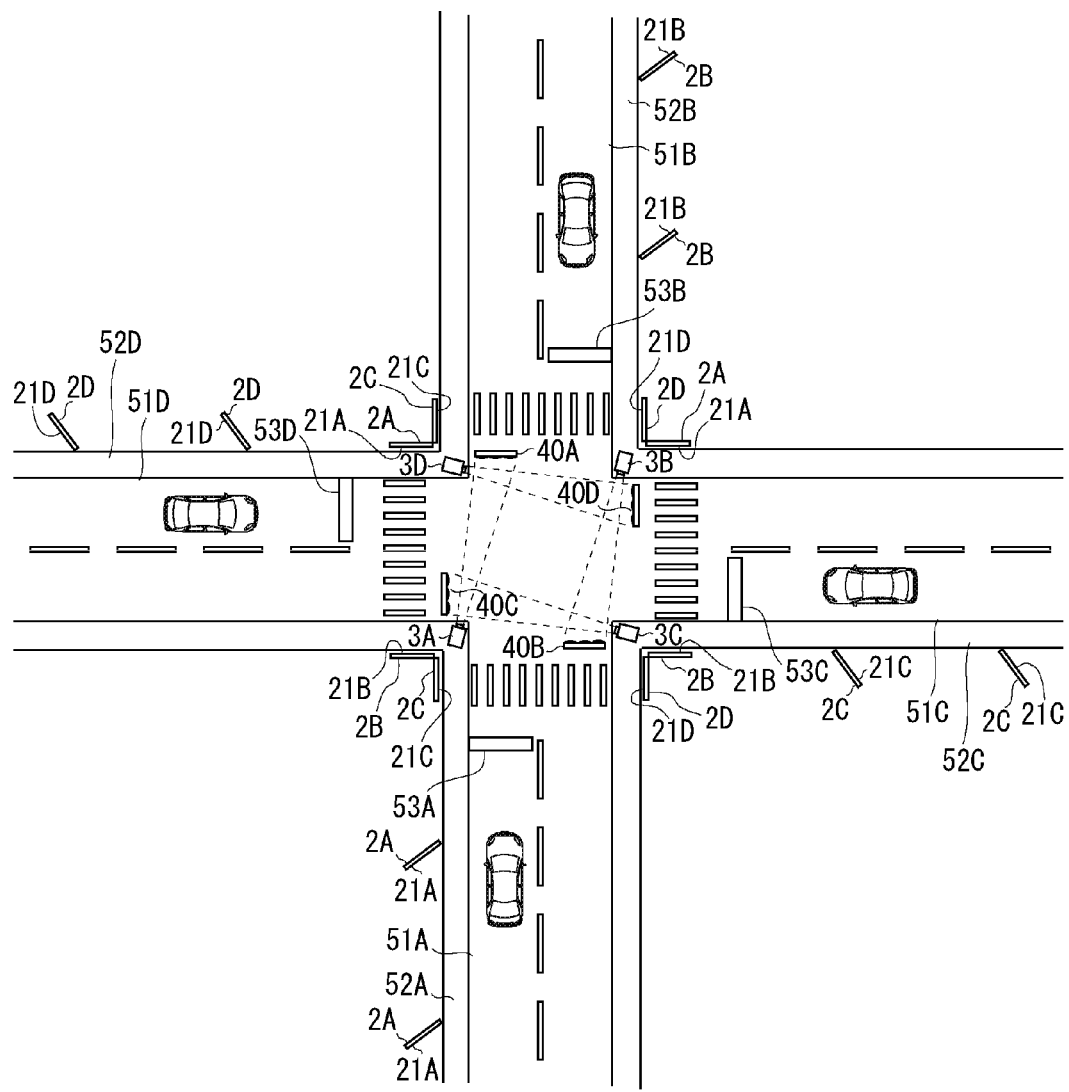

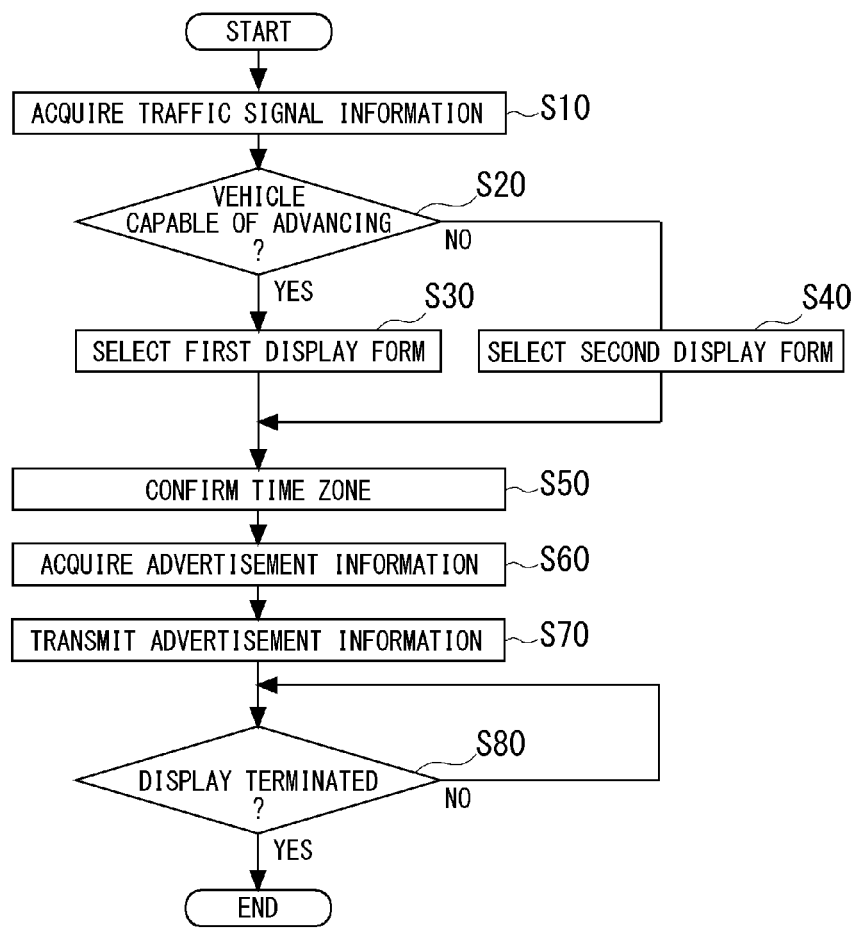

[Fig. 8]
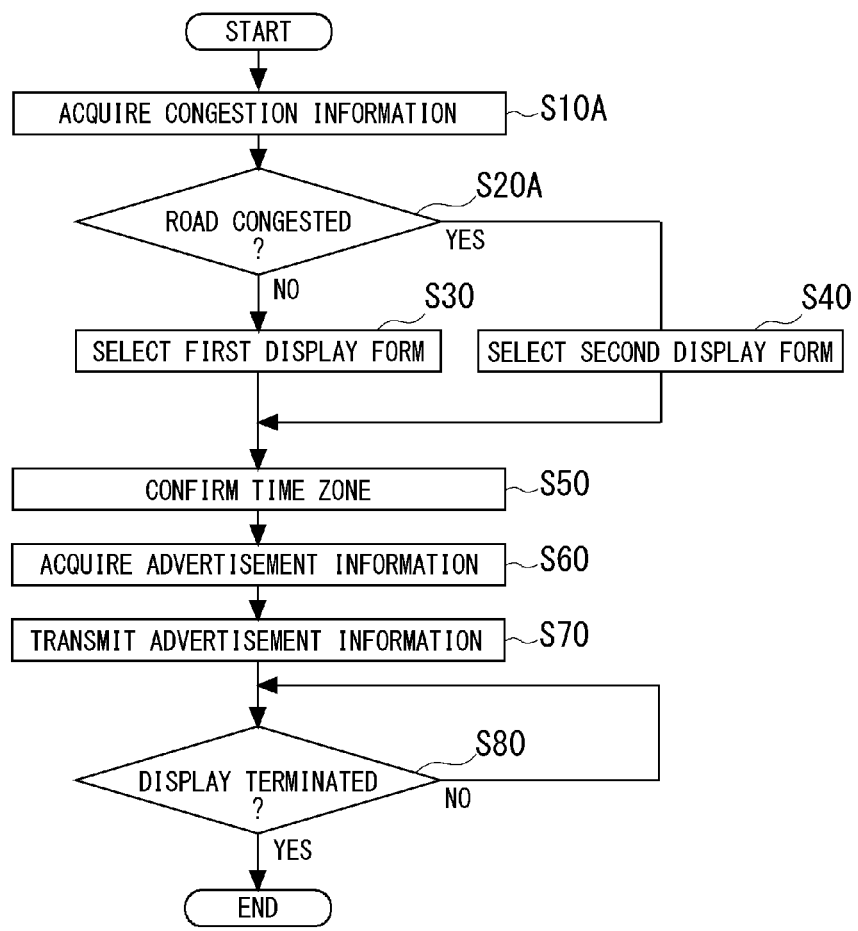

[Fig. 9]
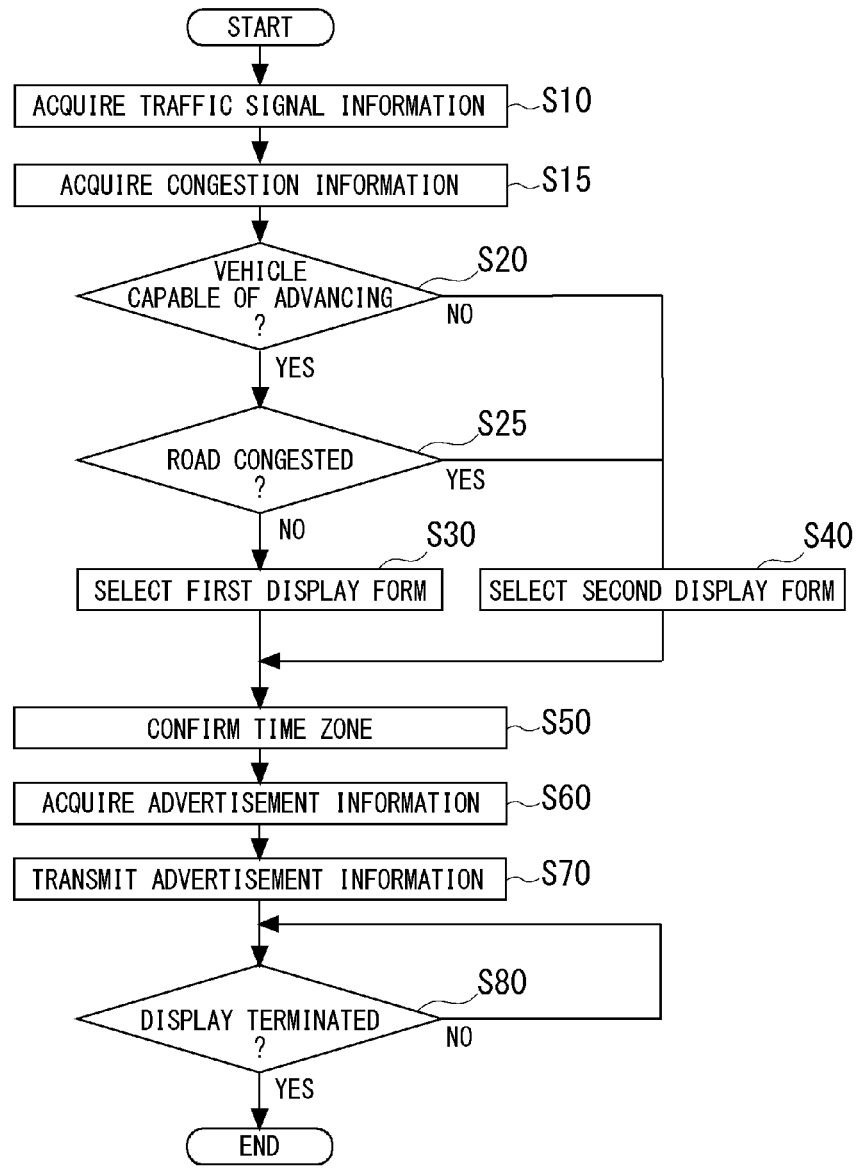

[Fig. 10]
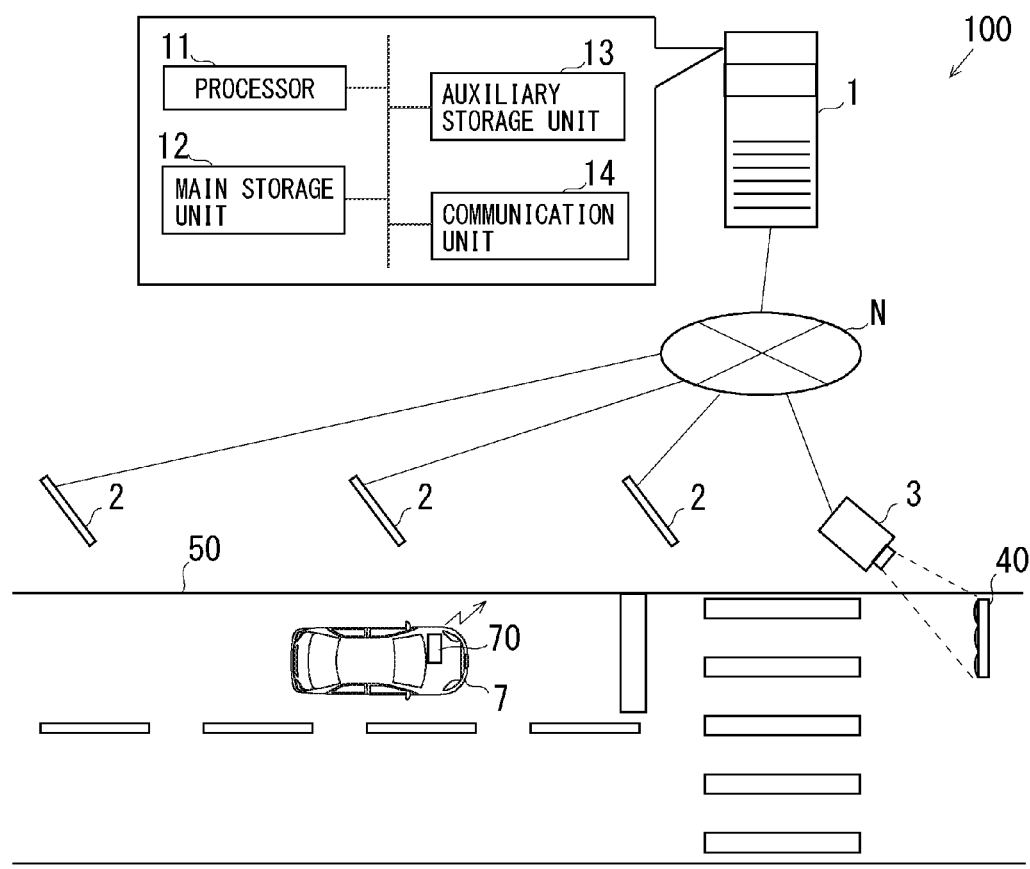

[Fig. 11]
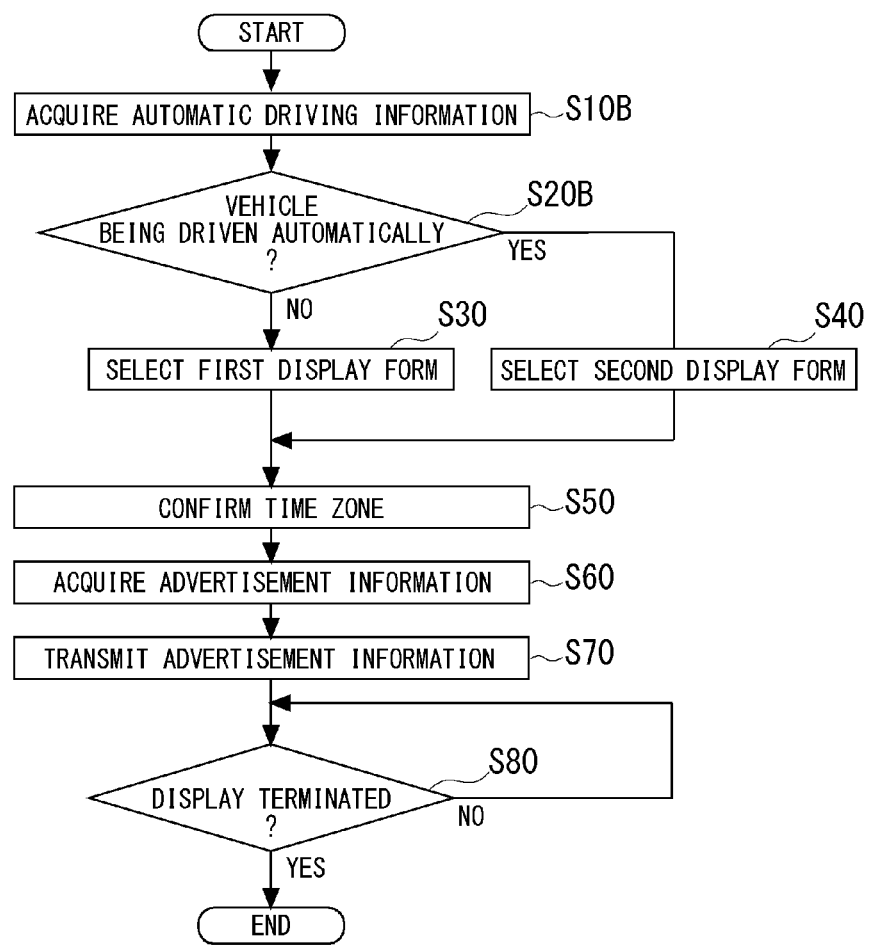

[Fig. 12]
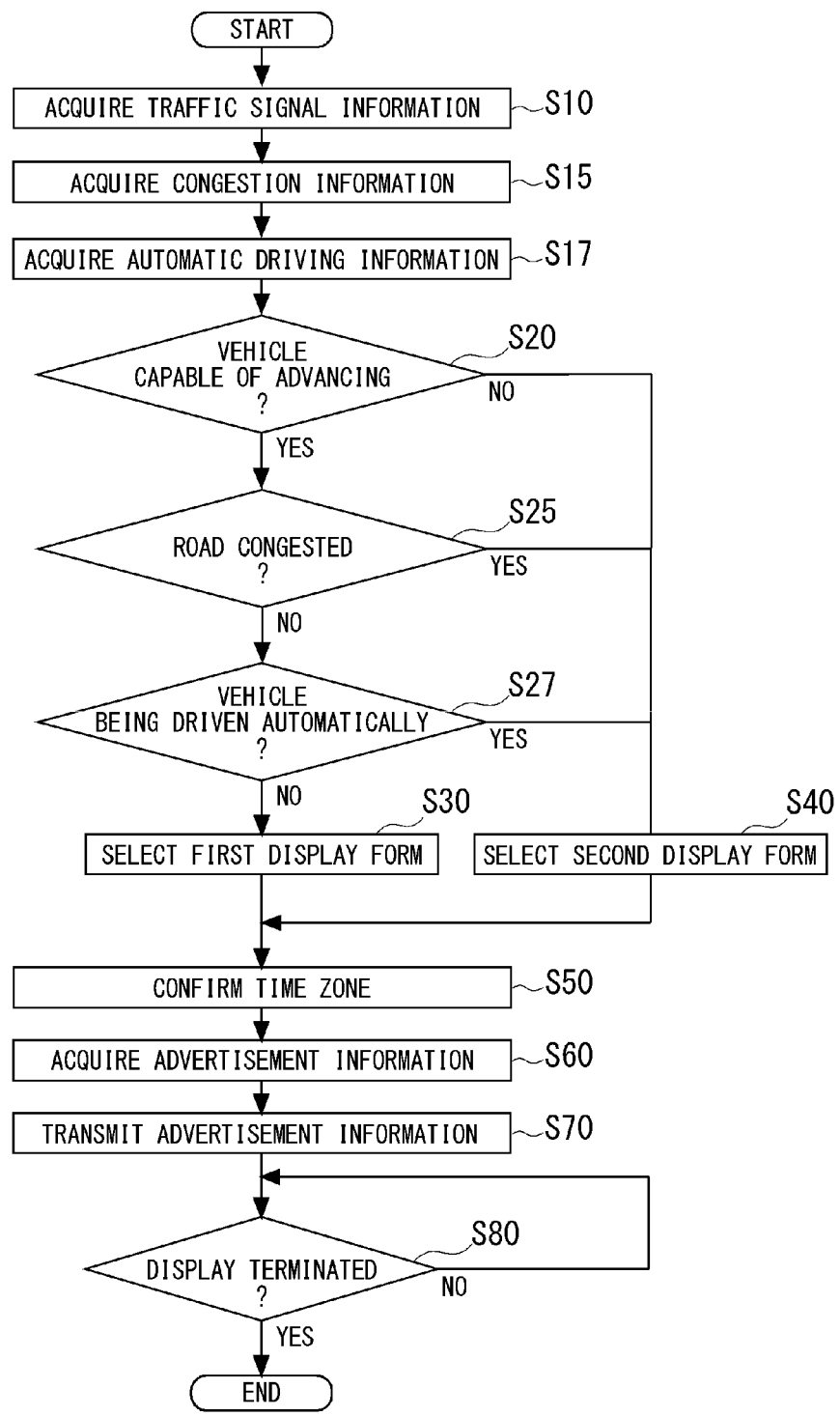

INFORMATION PROCESSING APPARATUS, INFORMATION PROCESSING METHOD AND NON-TRANSITORY STORAGE MEDIUM

CROSS-REFERENCE TO RELATED APPLICATIONS

This application claims the benefit of Japanese Patent Application No. 2018-156726, filed on Aug. 23, 2018, which is hereby incorporated by reference herein in its entirety.

BACKGROUND

Technical Field

The present disclosure relates to an information processing apparatus, an information processing method, and a non-transitory storage medium.

Description of the Related Art

In recent years, the digital signage becomes broadly widespread, and the digital signage is installed at various places. Further, such a technique is known that the display state of a traffic signal is acquired at an intersection. For example, Patent Literature 1 describes such a technique that if it is detected that a vehicle is positioned in an intersection and that the vehicle is in a state of waiting for the turning to the right, then the signal display information, which indicates the signal display state of a traffic signal for an opposite lane, is acquired, and a driver is informed of the signal display information.

CITATION LIST

Patent Literature

Patent Literature 1: Japanese Patent Application Laid-Open No.
2006-155319

SUMMARY

An object of the present disclosure is to provide such a technique that advertisement information is displayed in an appropriate display form in conformity with a traveling situation of a vehicle with respect to a crew of the vehicle.

The present disclosure resides in an information processing apparatus for displaying advertisement information on a display apparatus installed with a display surface directed to a road. The information processing apparatus comprises a controller including at least one processor. The controller may be configured to execute:

acquiring a traveling situation of a vehicle which travels on the road;

selecting a first display form or a second display form having an amount of information larger than that of the first display form, as the display form of the advertisement information on the basis of the traveling situation; and displaying the advertisement information on the display apparatus in the display form selected on the basis of the traveling situation.

In another aspect, the present disclosure can be also grasped as an information processing method for displaying advertisement information on a display apparatus installed with a display surface directed to a road. In this aspect, the information processing method according to the present disclosure may be adapted to cause a computer to execute:

a step of acquiring a traveling situation of a vehicle which travels on the road;

a step of selecting a first display form or a second display form having an amount of information larger than that of the first display form, as the display form of the advertisement information on the basis of the traveling situation; and a step of displaying the advertisement information on the display apparatus in the display form selected on the basis of the traveling situation.

In still another aspect, the present disclosure can be also grasped as an information processing program for displaying advertisement information on a display apparatus installed with a display surface directed to a road, or a non-transitory storage medium stored with the information processing program. In this aspect, the information processing program may be adapted to cause a computer to execute:

a step of acquiring a traveling situation of a vehicle which travels on the road;

a step of selecting a first display form or a second display form having an amount of information larger than that of the first display form, as the display form of the advertisement information on the basis of the traveling situation;

and a step of displaying the advertisement information on the display apparatus in the display form selected on the basis of the traveling situation.

According to the present disclosure, it is possible to provide such a technique that the advertisement information is displayed in the appropriate display form in conformity with the traveling situation of the vehicle with respect to the crew of the vehicle.

BRIEF DESCRIPTION OF THE DRAWINGS

FIG. 1 shows schematic configuration of an advertisement display system according to an embodiment.

FIG. 2 exemplifies functional configuration of an information processing apparatus.

FIG. 3 shows an exemplary advertisement information table.

FIG. 4 shows an exemplary advertisement information table in which advertisement information in a first display form and advertisement information in a second display form are registered in relation to each of identical advertisement elements.

FIG. 5 shows an exemplary photographed image in which a traffic signal is photographed.

FIG. 6 shows an arrangement of cameras and display apparatuses when a plurality of roads are used as display targets of advertisement information.

FIG. 7 shows a processing procedure of a display control method executed by the information processing apparatus.

FIG. 8 shows a processing procedure of a display control method according to a first modified embodiment.

FIG. 9 shows a processing procedure of a display control method according to a second modified embodiment.

FIG. 10 shows schematic configuration of an advertisement display system according to a third modified embodiment.

FIG. 11 shows a processing procedure of a display control method according to the third modified embodiment.

FIG. 12 shows a processing procedure of a display control method according to a fourth modified embodiment.

DESCRIPTION OF THE EMBODIMENTS

As the digital signage becomes widespread, the digital signage, which is installed along the road, is seen at increased opportunities during the traveling by a vehicle. However, a crew of the traveling vehicle, especially a driver cannot see the advertisement information displayed on the digital signage in detail. Therefore, if the advertisement information has detailed contents and/or if the advertisement information is expressed as a moving image, then it is impossible to sufficiently grasp the contents in some cases. On this account, it is conceived that the advertisement information is expressed as a simple content or a still image to perform the display while suppressing the amount of information, in order that the content can be easily grasped even by the crew of the traveling vehicle. On the other hand, if the vehicle stops due to the red traffic light or if the traveling speed is low due to the traffic jam, then the advertisement information having any complicated content or any moving image, which has a large amount of information, can be grasped even by the crew of the vehicle.

On this account, the technique of the digital signage installed along the road, in which the advertisement information is displayed while merely suppressing the amount of information, is not appropriate, because the display is performed for the crew of the vehicle which stops, with the amount of information smaller than the amount of information capable of being grasped by the crew. For example, the opportunity is impaired, which would otherwise make it possible to notify a larger amount of information with detailed contents or with any moving image.

Taking the foregoing circumstances into consideration, the embodiment of the present disclosure provides an information processing apparatus (computer) which selects the display form of the advertisement information on the basis of the traveling situation of the vehicle and which displays the advertisement information on the digital signage in the selected display form. In the embodiment of the present disclosure, the display form is exemplified, for example, by a first display form in which the advertisement information is displayed with a simple content or with a still image and a second display form in which the advertisement information is displayed with a detailed display or with a moving image having an amount of information larger than that of the first display form. In the embodiment of the present disclosure, the digital signage is a display apparatus which displays the advertisement information and which is hereinafter simply referred to as "display apparatus" as well.

The information processing apparatus displays the advertisement information on the display apparatus which is installed along the road with a display surface directed to the road, in other words, the display apparatus which performs the display for the crew of the vehicle traveling on the road. In the embodiment of the present disclosure, the vehicle may be, for example, a passenger car, a bus, or a taxi, i.e., any transport means on which any person assumed to see the display apparatus gets to move on the road. The vehicle may include transport means including, for example, a bicycle, a motorcycle, and a streetcar. Further, in the embodiment of the present disclosure, it is enough that the crew is a person who gets on the vehicle, and the crew is not limited to a driver or a crew member.

The advertisement information can include advertisements of restaurants, amusement facilities and the like as well as traffic information, sightseeing information, weather information, information about disaster warning, evacuation advisory and the like (hereinafter referred to as "disaster information" as well), and various types of information about congestion situations of facilities and slogans or mottoes for enlightening the safe driving.

According to the embodiment of the present disclosure, the information processing apparatus selects the first display form or the second display form as the display form of the advertisement information on the basis of the traveling situation of the vehicle, and the information processing apparatus allows the display apparatus to display the advertisement information in the selected display form. For example, the information processing apparatus of the embodiment of the present disclosure operates as follows in relation to the road on which the traffic signal is installed. That is, in the case of such a situation that the traffic signal indicates the green light and the vehicle travels on the road without making any stop, the first display form is selected to display, on the display apparatus, the advertisement information composed of the simple content or the still image. Accordingly, the information processing apparatus can display the advertisement information in the form of being easily grasped for the crew of the traveling vehicle. On the other hand, in the case of such a situation that the traffic signal indicates the red light and the vehicle stops in front of the traffic signal, the second display form is selected to display, on the display apparatus, the advertisement information composed of the detailed content or the moving image. Accordingly, the information processing apparatus can display the advertisement information in detail for the crew of the stopped vehicle. As described above, the information processing apparatus of the embodiment of the present disclosure can display the advertisement information in the appropriate display form in conformity with the traveling situation of the vehicle with respect to the crew of the vehicle.

Embodiment (System Outline)

FIG. 1 shows schematic configuration of an advertisement display system according to this embodiment. In the example shown in FIG. 1, the advertisement display system comprises an information processing apparatus 1 and a plurality of display apparatuses 2. The information processing apparatus 1 of this embodiment acquires the information (hereinafter referred to as "traffic signal information" as well) which is indicated by a lighting instrument of a traffic signal installed on a road (50) for displaying an advertisement thereon, as a traveling situation of a vehicle traveling on the road (50). For example, the information processing apparatus 1 has a camera 3 for photographing the traffic signal. A photographed image, which is obtained by the camera 3, is analyzed to acquire the signal indicated by the lighting instrument of each traffic signal.

Then, if the traffic signal information indicates the green light (green signal), then the information processing apparatus 1 selects the first display form, and the information processing apparatus 1 transmits the advertisement information of the simple content or the still image to the display apparatuses 2 via a communication line N so that the advertisement information is displayed. On the other hand, if the traffic signal information indicates the red light (red signal), then the information processing apparatus 1 selects the second display form, and the information processing apparatus 1 transmits the advertisement information of the detailed content or the moving image to the display apparatuses 2 via the communication line N so that the advertisement information is displayed.

The communication line N is a wired or wireless communication line. For example, it is also allowable to adopt a public communication network such as the internet or the like or a communication network such as WAN (Wide Area Network) or the like. Further, the communication line N may include a telephone communication network for mobile phones or the like and/or a wireless communication network such as Wi-Fi or the like.

(Apparatus Configuration)

The information processing apparatus 1 is composed of, for example, a computer. Such a computer 1 is provided with a processor 11, a main storage unit 12 such as read only memory (ROM), random access memory (RAM) and the like, an auxiliary storage unit 13 such as EPROM, hard disk drive (HDD), removable media and the like, and a communication unit 14 for making communication with the display apparatuses 2, the camera 3 and other devices or apparatuses.

The processor 11 is a form of the controller. The processor 11 is also referred to as "CPU". The processor 11 is not limited to a single processor. The processor 11 may be configured as a multiprocessor. Further, the processor 11 may be configured in a multi-core form.

The auxiliary storage unit 13 stores, for example, an operating system (OS), various programs, and various tables. Further, the auxiliary storage unit 13 of this embodiment stores advertisement information and advertisement information tables as described later on.

The processor 11 loads the program stored in the auxiliary storage unit 13 to the operation area of the main storage unit 12 so that the program is executed. For example, the respective configuration units are controlled in accordance with the execution of the program. Thus, it is possible to realize respective functional units so that a predetermined object is achieved as described later on. However, a part or all of the functional units may be realized by any hardware circuit (controller) such as ASIC and FPGA. The information processing apparatus 1 is not necessarily configured by a single computer. The information processing apparatus 1 may be configured by a plurality of computers which cooperate with each other.

(Functional Configuration)

FIG. 2 shows functional configuration of the information processing apparatus. The information processing apparatus 1 realizes the functions shown in FIG. 2 by allowing the processor 11 to load the application program (advertisement display program) stored in the auxiliary storage unit 13 to the main storage unit 12 so that the application program (advertisement display program) is executed. That is, the information processing apparatus 1 includes a situation acquiring unit 101, a selection unit 102, and a display control unit 103.

The situation acquiring unit 101 acquires the traveling situation of the vehicle (7) traveling on the road (50). For example, the signal (traffic signal information), which is indicated by the lighting instrument of the traffic signal installed on the road (50) as the target for displaying the advertisement information thereon, is acquired as the traveling situation of the vehicle (7). Note that a specified process for acquiring the traffic signal information will be described later on.

The selection unit 102 selects the first display form or the second display form having the amount of information larger than that of the first display form, as the display form of the advertisement information on the basis of the traveling situation. In this embodiment, the first display form is such a form that a simple content and/or a still image, which is/are composed of only a store (shop) name and/or a catchphrase, is/are displayed. This form has the small amount of information as compared with the second display form. On the other hand, the second display form is such a form that a detailed content and/or a moving image, which is/are composed of, for example, a guide map of the store (shop) and/or a specified explanation of merchandise, is/are displayed. This form has the large amount of information as compared with the first display form.

The display control unit 103 allows the display apparatus 2 to display the advertisement information in the display form selected on the basis of the traveling situation. For example, the display control unit 103 makes reference to the advertisement information table to specify the advertisement information in the display form selected by the selection unit 102. The advertisement information is read from the auxiliary storage unit 13. The advertisement information is delivered to the display apparatus 2 via the communication line N so that the advertisement information is displayed. FIG. 3 shows an exemplary advertisement information table 60. The advertisement information table 60 shown in FIG. 3 has a first table 61 and a second table 62. The first table 61 registers the identification information of the advertisement information in which the display content is displayed as the simple advertisement information and/or the still image, i.e., the advertisement information in the first display form. The second table 62 registers the identification information of the advertisement information in which the display content is displayed as the detailed advertisement information and/or the moving image, i.e., the advertisement information in the second display form.

If the first display form is selected by the selection unit 102, the display control unit 103 reads the advertisement information in the first display form from the auxiliary storage unit 13 on the basis of the identification information of the advertisement information registered in the first table 61. This advertisement information is transmitted to the display apparatus 2 so that the advertisement information is displayed. On the other hand, if the second display form is selected by the selection unit 102, the display control unit 103 reads the advertisement information in the second display form from the auxiliary storage unit 13 on the basis of the identification information of the advertisement information registered in the second table 62. This advertisement information is transmitted to the display apparatus 2 so that the advertisement information is displayed.

Further, the advertisement order and the time zone for performing the advertisement may be registered with respect to the identification information of each of the pieces of advertisement information in the first table 61 and the second table 62. Note that in FIG. 3, the value of each item is expressed in the language used by human for the convenience of explanation. However, it is allowable to adopt any form capable of being processed by the information processing apparatus 1. For example, the value may be expressed in binary data.

If the current time, which is provided when the display is performed, is in the time zone of commuting to work, the display control unit 103 displays the advertisement information in which the time zone of commuting to work is registered in the item of the time zone, in the order (1 to 10 in the example shown in FIG. 3) indicated in the item of the advertisement order. Similarly, if the current time is in the time zone of daytime, the display control unit 103 successively displays the advertisement information having the advertisement orders of 11 to 20. If the current time is in the time zone of returning home, the display control unit 103 successively displays the advertisement information having the advertisement orders of 21 to 30. That is, the display control unit 103 varies the advertisement information to be displayed on the display apparatus 2 depending on every time zone. Note that the advertisement information to be displayed may be varied depending on the day of week or the season, without being limited to the time zone.

Alternatively, the advertisement information which is in the first display form and the advertisement information which is in the second display form are registered beforehand in an advertisement information table for each of the elements (hereinafter referred to as "advertisement elements" as well) of, for example, the merchandise, the service, and the information subjected to the advertisement. The advertisement information in the display form selected by the selection unit 102 therefrom may be displayed on the display apparatus 2. FIG. 4 shows an exemplary advertisement information table 60A in which advertisement information in the first display form and advertisement information in the second display form are registered in relation to each of identical advertisement elements.

Pieces of the identification information of the advertisement information in the first display form and the advertisement information in the second display form are registered for each of the advertisement elements in the advertisement information table 60A in which the advertisement order and the time zone are registered. Accordingly, the display control unit 103 specifies the advertisement element to be displayed in accordance with the order indicated in the item of the advertisement order, of the advertisement elements to be displayed in the time zone to which the current time belongs. Then, the display control unit 103 displays, on the display apparatus 2, the advertisement information selected by the selection unit 102, of the advertisement information in the first display form and the advertisement information in the second display form as correlated with the advertisement element. For example, the information processing apparatus 1 stores beforehand, for the store A (advertisement element), the advertisement information in the first display form such as the name of the store and the photograph of the store and the advertisement information in the second display form such as the guide map of the store A and the moving image for introducing the store A, in the auxiliary storage unit 13. Then, the information processing apparatus 1 displays, on the display apparatus 2, the name of the store and the photograph (still image) if the traffic signal information is the green light at the timing at which the advertisement information of the store A is displayed. On the other hand, the information processing apparatus 1 displays, on the display apparatus 2, the guide map of the store A and the moving image for introducing the store A if the traffic signal information is the red light at the timing at which the advertisement information of the store A is displayed.

Note that there is no limitation to such configuration that the display control unit 103 transmits the advertisement information to the display apparatus 2 every time when the advertisement information is displayed on the display apparatus 2. It is also allowable to adopt such configuration that the advertisement information is previously stored in each of the display apparatuses 2. In this case, the following configuration may be exemplified. That is, a control signal, which specifies the advertisement information in the display form selected by the selection unit 102, is transmitted to each of the display apparatuses by the display control unit 103. The advertisement information, which is specified on the basis of the control signal, is displayed by each of the display apparatuses 2.

Next, an explanation will be made about a specified process in order that the situation acquiring unit 101 acquires the traffic signal information. FIG. 5 shows an exemplary photographed image in which the traffic signal 40 is photographed with the camera 3. As shown in FIG. 5, the traffic signal 40 has a lighting instrument 41 which emits green (blue) light, a lighting instrument 42 which emits yellow light, and a lighting instrument 43 which emits red light. The situation acquiring unit 101 acquires, from the photographed image, the color of the lighting instrument 41 to 43 which is emitting the light at a luminance (brightness) of not less than a predetermined threshold value, as the traffic signal information. That is, the situation acquiring unit 101 acquires the traffic signal information to indicate the green (blue) color, the yellow color, or the red color. Note that the traffic signal information of the green color is also referred to as "green light", the traffic signal information of the yellow color is also referred to as "yellow light", and the traffic signal information of the red color is also referred to as "red light".

Further, the lighting instruments 41 to 43, which emit the lights of respective colors, have positions which are previously decided. Therefore, the color may be distinguished depending on the position. For example, if the lighting instrument 41, which is disposed on the leftmost side, emits the light of not less than the threshold value, the traffic signal information, which indicates the green, is acquired. If the lighting instrument 42, which is disposed at the center, emits the light, the traffic signal information, which indicates the yellow, is acquired. If the lighting instrument 43, which is disposed on the rightmost side, emits the light, the traffic signal information, which indicates the red, is acquired. Note that in the case of a vertical type traffic signal, the situation acquiring unit 101 acquires the traffic signal as follows. That is, if the lighting instrument, which is disposed on the lowermost side, emits the light of not less than a predetermined threshold value, the situation acquiring unit 101 acquires the traffic signal information which indicates the green. If the lighting instrument, which is disposed at the center, emits the light, the situation acquiring unit 101 acquires the traffic signal information which indicates the yellow. If the lighting instrument, which is disposed on the uppermost side, emits the light, the situation acquiring unit 101 acquires the traffic signal information which indicates the red. Further, if a green arrow is indicated, the situation acquiring unit 101 acquires the traffic signal information which indicates the green. Further, if the lighting instrument is blinking, the situation acquiring unit 101 acquires the traffic signal information which indicates the color of the lighting instrument and the blinking situation, for example, the yellow blinking or the red blinking.

Note that if a plurality of roads are targets for displaying the advertisement information, the situation acquiring unit 101 acquires the traffic signal information from traffic signals installed on the respective roads. FIG. 6 shows an arrangement of cameras 3A to 3D and display apparatuses 2A to 2D when lanes 51A to 51D of the plurality of roads are used as display targets of the advertisement information in this embodiment. FIG. 6 shows an example of such a place that the roads having two lanes, which are based on the driving on the left side of the road, intersect.

The left side lane 51A of the road depicted on the lower side of FIG. 6 is the lane on which the vehicles travel from the lower side to the upper side of FIG. 6. The traffic signal 40A is provided for the vehicles traveling on the lane 51A to display, for example, the signal (green light) which indicates that the vehicles can advance and the signal (red light) which indicates that the vehicles are prohibited to advance while exceeding a stop line 53A, i.e., the vehicles cannot advance. The vehicles travel from the upper side to the lower side of FIG. 6 on the lane 51B which is the opposite lane of the lane 51A. The traffic signal 40B is provided for the vehicles traveling on the lane 51B to display, for example, the signal (green light) which indicates that the vehicles can advance and the signal (red light) which indicates that the vehicles are prohibited to advance while exceeding a stop line 53B.

Further, the left side lane 51C of the road depicted on the right side of FIG. 6 is the lane on which the vehicles travel from the right side to the left side of FIG. 6. The traffic signal 40C is provided for the vehicles traveling on the lane 51C to display, for example, the signal (green light) which indicates that the vehicles can advance and the signal (red light) which indicates that the vehicles are prohibited to advance while exceeding a stop line 53C. The vehicles travel from the left side to the right side of FIG. 6 on the lane 51D which is the opposite lane of the lane 51C. The traffic signal 40D is provided for the vehicles traveling on the lane 51D to display, for example, the signal (green light) which indicates that the vehicles can advance and the signal (red light) which indicates that the vehicles are prohibited to advance while exceeding a stop line 53D.

The cameras 3A to 3D are provided respectively at positions at which the traffic signals 40A to 40D can be photographed. The situation acquiring unit 101 acquires respectively the pieces of traffic signal information of the traffic signals 40A to 40D from the cameras 3A to 3D. Note that it is previously decided that by which cameras 3A to 3D the traffic signals 40A to 40D are photographed respectively. Therefore, when the situation acquiring unit 101 acquires the traffic signal information by making communication with the cameras 3A to 3D, the situation acquiring unit 101 can distinguish the traffic signal information of each of the traffic signals 40A to 40D on the basis of the identification information (for example, MAC address) of each of the cameras 3A to 3D.

Further, each of the display apparatuses 2A to 2D is installed on the land or the building (hereinafter referred to as "neighboring land" as well) which is adjacent to each of the lanes 51A to 51D while interposing each of sidewalks (pavements) with each of display surfaces 21A to 21D directed to each of the lanes 51A to 51D. The place of installation of the display apparatus 2A to 2D is not limited to the neighboring land of the road. The place of installation may be any place which can be seen by the crew of the vehicle which travels on the road. For example, the place of installation may be a planting strip or a median strip of the road. Note that the classification of the advertisement information to be displayed may be determined depending on each of the places of installation of the display apparatuses, for example, such that the traffic information and/or the weather information is/are displayed on the display apparatus installed at the planting strip or the median strip, and the information to introduce the shop/store and/or the amusement facility is displayed on the display apparatus installed at the neighboring land of the road.

Note that FIGS. 5 and 6 are illustrative of the exemplary case in which the traffic signal information is acquired by photographing the traffic signal 40 by means of the camera 3. However, there is no limitation thereto. The traffic signal information of each of the traffic signals 40 may be acquired from a traffic control center which controls the traffic signals 40.

(Advertisement Display Method)

FIG. 7 shows a processing procedure of a display control method (information processing method) executed by the information processing apparatus 1. The process shown in FIG. 7 is started, for example, taking the opportunity of the turning ON of the power source of the information processing apparatus 1 or the execution of the operation to start the process by the administrator of the information processing apparatus 1.

In Step S10, the information processing apparatus 1 acquires, as the traveling situation, the traffic signal information from the camera 3 (FIG. 1). Note that as shown in FIG. 6, the information processing apparatus 1 may acquire pieces of the traffic signal information of the traffic signals 40A to 40D installed on the plurality of roads from the plurality of cameras 3A to 3D. Note that the following configuration is also available. That is, if the traffic signal 40A and the traffic signal 40B display the same signal at the same timing, the traffic signal information of any one of them may be acquired. Similarly, the following configuration is also available. That is, if the traffic signal 40C and the traffic signal 40D display the same signal at the same timing, the traffic signal information of any one of them may be acquired.

In Step S20, the information processing apparatus 1 judges whether or not the vehicle is capable of advancing on the basis of the traffic signal information acquired in Step S10. Note that if the traffic signal information is the green light (green signal), the green arrow signal, or the yellow blinking signal, the vehicle is capable of advancing. Therefore, the affirmative judgment is made. On the other hand, if the traffic signal information is the yelling signal, the vehicle does not stop completely in many cases. Therefore, in this embodiment, the affirmative judgment is made. Further, if the traffic signal information is the red blinking signal, the vehicle is capable of advancing after the vehicle should once stop to confirm the safety. Therefore, in this embodiment, the affirmative judgment is made. If the traffic signal information is the red signal, the vehicle is prohibited from advancing while exceeding the stop line. Therefore, the negative judgment is made.

If the affirmative judgment is made in Step S20, then the information processing apparatus 1 proceeds to Step S30, and the first display form is selected. On the other hand, if the negative judgment is made in Step S20, then the information processing apparatus 1 proceeds to Step S40, and the second display form is selected.

In Step S50, the information processing apparatus 1 acquires the current time to confirm to what time zone the current time belongs, the time zone being selected from predetermined time zones including, for example, the time zone of commuting to work, the time zone of daytime (daylight), the time zone of returning home, and the time zone of middle of night.

In Step S60, the information processing apparatus 1 makes reference to the advertisement information table to acquire, from the auxiliary storage unit 13, the advertisement information which is in the display form selected in Step S30 or Step S40 and which is to be displayed in the current time zone confirmed in Step S50.

In Step S70, the information processing apparatus 1 transmits the advertisement information acquired in Step S60 to the display apparatuses 2A to 2D (FIG. 6) so that the advertisement information is displayed.

In Step S80, the information processing apparatus 1 judges whether or not the display of the advertisement information is terminated. For example, it is judged that the display is terminated if a predetermined time elapses after the start of the display of the advertisement information.

If the affirmative judgment is made in Step S80, the information processing apparatus 1 terminates the process shown in FIG. 7. Note that the information processing apparatus 7 repeatedly executes the process shown in FIG. 7 until the power source is shut off or until the stop operation is performed by the administrator. Note that when the information processing apparatus 1 repeatedly executes the process shown in FIG. 7 to acquire the advertisement information in Step S60, then the piece of the advertisement information, which is next to the piece of advertisement information displayed in the previous process, may be acquired on the basis of the order of advertisement of the advertisement information table, and the pieces of the advertisement information may be displayed in succession. Further, the process is configured such that the advertisement information, which conforms to the current time zone, is acquired and displayed in Steps S50 to S70. However, there is no limitation thereto. The process may be configured such that Step S50 is omitted, and the advertisement information to be displayed is not distinguished depending on the time zone.

(Function and Effect)

The information processing apparatus 1 of this embodiment acquires the traffic signal information as the traveling situation. Therefore, the information processing apparatus 1 can specify whether the vehicle is traveling or the vehicle is stopping. If the vehicle is traveling, the advertisement information in the first display form, which is easily grasped, is displayed. If the vehicle is stopping, the advertisement information in the second display form, in which the amount of information is large, is displayed. As described above, the information processing apparatus 1 of this embodiment makes it possible to appropriately display the advertisement information in conformity with the traveling situation.

First Modification of Embodiment

The embodiment described above is illustrative of the exemplary case in which the traffic signal information is acquired as the traveling situation. However, there is no limitation thereto. It is also allowable to adopt such configuration that the information (hereinafter referred to as "congestion information" as well), which indicates the degree of congestion of the road, is acquired as the traveling information, and the display form is selected depending on the congestion information. Note that the other configuration is the same as that of the embodiment described above. Therefore, for example, the same elements are designated by the same reference numerals, and thus any duplicate explanation will be omitted.

In this modified embodiment, the traffic signal is not photographed with the camera 3, but the vehicles traveling on the road are photographed. Then, the situation acquiring unit 101 of the information processing apparatus 1 extracts the vehicle by means of the pattern matching from the photographed image of the camera 3. The situation acquiring unit 101 of the information processing apparatus 1 calculates the vehicle speed from the distance by which the vehicle advances in a predetermined time to acquire the congestion information on the basis of the vehicle speed. For example, if a state, in which the vehicle speed is less than a predetermined value (30 km/h), continues for not less than a predetermined time (for example, 1 minute), the situation acquiring unit 101 acquires the congestion information which indicates that the road is crowded or congested. That is, the congestion is not affirmed, for example, if the vehicle temporarily lowers the speed, for example, in order to turn right or left. The congested situation is affirmed if the vehicle, which has the lowered speed, exists for not less than the predetermined time. Further, if the state, in which the vehicle speed is less than the predetermined value, does not continue, or if a state, in which the vehicle speed is not less than the predetermined value, is provided, then the congestion information, which indicates that the road is not crowded or congested, is acquired.

The situation acquiring unit 101 is not necessarily configured such that the vehicle speed is calculated from the photographed image of the camera 3. It is also allowable to adopt such configuration that the vehicle speed of the vehicle is acquired by making communication with a vehicle onboard apparatus (device) such as a navigation device or the like carried on the vehicle. Further, the situation acquiring unit 101 may acquire the traffic jam information of VICS (Vehicle Information and Communication System (registered trademark)) from a beacon or FM broadcasting, and the traffic jam information may be used as the congestion information.

FIG. 8 shows a processing procedure of a display control method according to the first modified embodiment. In Step S10A, the information processing apparatus 1 acquires the congestion information as the traveling situation.

In Step S20A, the information processing apparatus 1 judges whether or not the road is congested on the basis of the congestion information acquired in Step S10A.

If the negative judgment is made in Step S20A, the information processing apparatus 1 proceeds to Step S30 to select the first display form. On the other hand, if the affirmative judgment is made in Step S20A, the information processing apparatus 1 proceeds to Step S40 to select the second display form. Note that the following processes (Steps S50 to S80) are the same as those shown in FIG. 7 described above.

According to this modified embodiment, in the case of the situation in which the road is not congested, the advertisement information in the first display form, which is easily grasped, is displayed. In the case of the situation in which the road is congested, the advertisement information in the second display form, in which the amount of information is large, is displayed. As described above, the information processing apparatus 1 of this modified embodiment makes it possible to appropriately display the advertisement information in conformity with the degree of congestion. Note that in this modified embodiment, the display form is selected depending on the congestion information. However, it is also allowable to adopt such configuration that the display form is selected depending on the vehicle speed. For example, the vehicle speed, which is calculated as described above, is acquired as the traveling situation in Step S10A shown in FIG. 8 to judge whether or not the vehicle speed is less than a predetermined value in Step S20A. Then, if the vehicle speed is not less than the predetermined value, the first display form is selected in Step S30. If the vehicle speed is less than the predetermined value, the second display form is selected in Step S40. Note that the following processes are the same as those shown in FIG. 8. As described above, even in the case of the configuration in which the display form is selected on the basis of the vehicle speed, it is possible to display the advertisement information in the appropriate display form in the same manner as in this modified embodiment.

Second Modification of Embodiment

In this modified embodiment, the traffic signal information and the congestion information are acquired as the traveling situation, and the display form is selected on the basis thereof. Note that the other configuration is the same as that of the embodiment or the first modified embodiment described above. Therefore, for example, the same elements are designated by the same reference numerals, and thus any duplicate explanation will be omitted.

In this modified embodiment, the configuration for acquiring the traffic signal information is the same as that of the embodiment described above, and the configuration for acquiring the congestion information is the same as that of the first modified embodiment. Note that if any camera is used to acquire the traffic signal information and the congestion information, it is also allowable to provide a camera for photographing the traffic signal 40 and a camera for photographing the vehicles traveling on the road respectively.

FIG. 9 shows a processing procedure of a display control method according to the second modified embodiment. The information processing apparatus 1 acquires the traffic signal information in Step S10, and the information processing apparatus 1 acquires the congestion information in Step S15.

In Step S20, the information processing apparatus 1 judges whether or not the vehicle is capable of advancing on the basis of the traffic signal information acquired in Step S10.

If the affirmative judgment is made in Step S20, the information processing apparatus 1 proceeds to Step S25 to judge whether or not the road is congested on the basis of the congestion information acquired in Step S15.

If the negative judgment is made in Step S25, the information processing apparatus 1 proceeds to Step S30 to select the first display form. On the other hand, if the negative judgment is made in Step S20, and if the affirmative judgment is made in Step S25, then the information processing apparatus 1 proceeds to Step S40 to select the second display form. Note that the following processes (Steps S50 to S80) are the same as those shown in FIG. 7 described above.

According to this modified embodiment, if the traffic signal 40 indicates the green light, and the road is not congested, then the vehicles can travel in this situation, and hence the information processing apparatus 1 displays the advertisement information in the first display form which can be easily grasped. On the other hand, even if the traffic signal 40 indicates the green light, if the road is congested, then the vehicles stop or stagnate in this situation, and hence the information processing apparatus 1 display the advertisement information in the second display form in which the amount of information is large. Further, if the traffic signal 40 indicates the red light, the information processing apparatus 1 displays the advertisement information in the second display form. As described above, the information processing apparatus 1 of this modified embodiment makes it possible to appropriately display the advertisement information in conformity with the traffic signal information and the congestion information.

Third Modification of Embodiment

The embodiment described above is illustrative of the exemplary case in which the traffic signal information is acquired as the traveling situation. However, there is no limitation thereto. It is also allowable to adopt such configuration that the information (hereinafter referred to as "automatic driving information" as well), which indicates whether or not the vehicle is being driven automatically, is acquired as the traveling information, and the display form is selected on the basis of the automatic driving information. Note that the other configuration is the same as that of the embodiment described above. Therefore, for example, the same elements are designated by the same reference numerals, and thus any duplicate explanation will be omitted.

FIG. 10 shows schematic configuration of an advertisement display system according to this modified embodiment. As shown in FIG. 10, in this modified embodiment, the vehicle 7 is provided with an automatic driving system 70. The automatic driving system 70 recognizes the route to the destination and the traffic situation of the surroundings, and the automatic driving system 70 performs the driving operation including, for example, the steering operation and the operation for acceleration and deceleration. Thus, the automatic driving system 70 makes it possible to perform the automatic driving until arrival at the destination. The information processing apparatus 1 makes communication with the automatic driving system 70 of the vehicle 7 via the communication line N to acquire, as the traveling situation, the information (automatic driving information) which indicates whether or not the vehicle 7 is being driven automatically.

FIG. 11 shows a processing procedure of a display control method according to the third modified embodiment. In Step S10B, the information processing apparatus 1 acquires the automatic driving information as the traveling situation.

In Step S20B, the information processing apparatus 1 judges whether or not the vehicle 7 is being driven automatically on the basis of the automatic driving information acquired in Step S10B.

If the negative judgment is made in Step S20B, the information processing apparatus 1 proceeds to Step S30 to select the first display form. On the other hand, if the affirmative judgment is made in Step S20B, the information processing apparatus 1 proceeds to Step S40 to select the second display form. Note that the following processes (Steps S50 to S80) are the same as those shown in FIG. 7 described above.

According to this modified embodiment, in the case of the situation in which the vehicle 7 is not being driven automatically, the information processing apparatus 1 displays the advertisement information in the first display form which is easily grasped. On the other hand, if the vehicle 7 is being automatically driven, then it is unnecessary for the crew of the vehicle 7 to pay attention to the driving, and the crew of the vehicle 7 can carefully watch the display apparatus 2. Therefore, the information processing apparatus 1 allows the display apparatus 2 to display the advertisement information in the second display form in which the amount of information is large. As described above, the information processing apparatus 1 of this modified embodiment makes it possible to appropriately display the advertisement information in conformity with whether or not the vehicle 7 is being driven automatically.

Forth Modification of Embodiment

In this modified embodiment, the traffic signal information, the congestion information, and the automatic driving information are acquired as the traveling situation, and the display form is selected on the basis thereof. Note that the other configuration is the same as that of the second modified embodiment described above. Therefore, for example, the same elements are designated by the same reference numerals, and thus any duplicate explanation will be omitted.

In this modified embodiment, the configuration for acquiring the automatic driving information is the same as that of the third modified embodiment described above, and the configuration for acquiring the traffic signal information and the congestion information is the same as that of the second modified embodiment.

FIG. 12 shows a processing procedure of a display control method according to the fourth modified embodiment. The information processing apparatus 1 acquires the traffic signal information in Step S10, acquires the congestion information in Step S15, and acquires the automatic driving information in Step S17.

In Step S20, the information processing apparatus 1 judges whether or not the vehicle is capable of advancing on the basis of the traffic signal information acquired in Step S10.

If the affirmative judgment is made in Step S20, the information processing apparatus 1 proceeds to Step S25 to judge whether or not the road is congested on the basis of the congestion information acquired in Step S15.

If the negative judgment is made in Step S25, the information processing apparatus 1 proceeds to Step S27 to judge whether or not the vehicle is being driven automatically on the basis of the automatic driving information acquired in Step S17.

If the negative judgment is made in Step S27, the information processing apparatus 1 proceeds to Step S30 to select the first display form. On the other hand, if the negative judgment is made in Step S20, and if the affirmative judgments are made in Steps S25 and S27, then the information processing apparatus 1 proceeds to Step S40 to select the second display form. Note that the following processes (Steps S50 to S80) are the same as those shown in FIG. 7 described above.

According to this modified embodiment, if the vehicle is not being driven automatically in the situation in which the traffic signal 40 indicates the green light and the road is not congested, then the driver pays attention to the driving, and hence the information processing apparatus 1 displays the advertisement information in the first display form which is easily grasped. On the other hand, even if the traffic signal 40 indicates the green light, if the vehicle is being driven automatically, then it is unnecessary for the driver to drive the vehicle. Therefore, the information processing apparatus 1 displays the advertisement information in the second display form in which the amount of information is large. As described above, the information processing apparatus 1 of this modified embodiment makes it possible to appropriately display the advertisement information in conformity with the traffic signal information, the congestion information, and the automatic driving information.

Other Embodiment

The embodiments described above are exemplified by way of example in every sense. The present disclosure may be carried out while appropriately making changes within a range without deviating from the gist or essential characteristics thereof.

Further, the configuration and the processes explained in this disclosure can be carried out while freely combining them unless any technical contradiction or inconsistency arises.

Further, the process, which has been explained as being performed by one apparatus or device, may be executed by a plurality of apparatuses or devices in a shared manner. Alternatively, the process, which has been explained as being performed by the different apparatuses or devices, may be executed by one apparatus or device without causing any problem. In the computer system, it is possible to flexibly change the way of realization of the respective functions by means of any hardware configuration (server configuration).

The present disclosure can be also realized such that a computer program, in which the functions explained in the foregoing embodiments are packaged, is supplied to a computer, and the program is read and executed by one or more processors possessed by the computer. The computer program as described above may be provided for the computer by means of any non-transitory computer-readable storage medium capable of being connected to a system bus of the computer, or the computer program may be provided for the computer by the aid of a network. The non-transitory computer-readable storage medium includes, for example, disks of arbitrary types such as magnetic disk (floppy (registered trademark) disk, hard disk drive (HDD) and the like), optical disk (CD-ROM, DVD disk, Blu-ray Disc and the like) and the like, read only memory (ROM), random access memory (RAM), EPROM, EEPROM, magnetic card, flash memory, optical card, and media of arbitrary types suitable for storing electronic commands.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus for displaying advertisement information on a display apparatus installed with a display surface directed to a road, the information processing apparatus comprising:
   a controller including at least one processor, the controller being configured to execute:
      acquiring a traveling situation of a vehicle which travels on the road;
      selecting a first display form or a second display form having an amount of information larger than that of the first display form, as the display form of the advertisement information on the basis of the traveling situation; and
      displaying the advertisement information on the display apparatus in the display form selected on the basis of the traveling situation,
   wherein the traveling situation indicates a degree of congestion of the road and information which indicates whether or not the vehicle is being driven automatically, the degree of congestion is determined based on (i) a speed of the vehicle and (ii) a time period during which the speed of the vehicle is measured, and the controller:
      selects the first display form if the degree of congestion is less than a predetermined value and if the vehicle is not being driven automatically,
      selects the second display form if the degree of congestion is less than the predetermined value and if the vehicle is being driven automatically, and
      selects the second display form if the degree of congestion is not less than the predetermined value.

2. The information processing apparatus according to claim 1, wherein the traveling situation also indicates information which is indicated by a lighting instrument of a traffic signal installed on the road.

3. The information processing apparatus according to claim 2, wherein the controller also acquires the information which is indicated by the lighting instrument of the traffic signal as the traveling situation, and the controller is configured to select the first display form if the information which is indicated by the lighting instrument indicates that the vehicle is capable of advancing, or the controller is configured to select the second display form if the information which is indicated by the lighting instrument indicates that the vehicle is incapable of advancing.

4. The information processing apparatus according to claim 1, wherein the controller varies the advertisement information to be displayed on the display apparatus depending on a time zone.

5. The information processing apparatus according to claim 2, wherein the controller varies the advertisement information to be displayed on the display apparatus depending on a time zone.

6. The information processing apparatus according to claim 3, wherein the controller varies the advertisement information to be displayed on the display apparatus depending on a time zone.

7. The information processing apparatus according to claim 1, wherein the degree of congestion is also determined based on (iii) a predetermined speed value, to which the speed of the vehicle is compared, and (iv) a predetermined time period, to which the time period is compared.

8. An information processing method for displaying advertisement information on a display apparatus installed with a display surface directed to a road, the information processing method causing a computer to execute:
  a step of acquiring a traveling situation of a vehicle which travels on the road;
  a step of selecting a first display form or a second display form having an amount of information larger than that of the first display form, as the display form of the advertisement information on the basis of the traveling situation; and
  a step of displaying the advertisement information on the display apparatus in the display form selected on the basis of the traveling situation,
  wherein the traveling situation indicates a degree of congestion of the road and information which indicates whether or not the vehicle is being driven automatically, the degree of congestion is determined based on (i) a speed of the vehicle and (ii) a time period during which the speed of the vehicle is measured, and the step of selecting comprises:
  selecting the first display form if the degree of congestion is less than a predetermined value and if the vehicle is not being driven automatically,
  selecting the second display form if the degree of congestion is less than the predetermined value and if the vehicle is being driven automatically, and
  selecting the second display form if the degree of congestion is not less than the predetermined value.

9. A non-transitory computer readable storage medium stored with an information processing program for displaying advertisement information on a display apparatus installed with a display surface directed to a road, the information processing program causing a computer to execute:
  a step of acquiring a traveling situation of a vehicle which travels on the road;
  a step of selecting a first display form or a second display form having an amount of information larger than that of the first display form, as the display form of the advertisement information on the basis of the traveling situation; and
  a step of displaying the advertisement information on the display apparatus in the display form selected on the basis of the traveling situation,
  wherein the traveling situation indicates a degree of congestion of the road and information which indicates whether or not the vehicle is being driven automatically, the degree of congestion is determined based on (i) a speed of the vehicle and (ii) a time period during which the speed of the vehicle is measured, and the step of selecting comprises:
  selecting the first display form if the degree of congestion is less than a predetermined value and if the vehicle is not being driven automatically,
  selecting the second display form if the degree of congestion is less than the predetermined value and if the vehicle is being driven automatically, and
  selecting the second display form if the degree of congestion is not less than the predetermined value.

* * * * *